(12) United States Patent
Kong et al.

(10) Patent No.: US 7,939,026 B2
(45) Date of Patent: May 10, 2011

(54) APPARATUS FOR CHEMICAL SYNTHESIS

(75) Inventors: Peter C. Kong, Idaho Falls, ID (US); J. Stephen Herring, Idaho Falls, ID (US); Jon D. Grandy, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 894 days.

(21) Appl. No.: 11/862,416

(22) Filed: Sep. 27, 2007

(65) Prior Publication Data

US 2008/0099327 A1 May 1, 2008

Related U.S. Application Data

(62) Division of application No. 10/693,291, filed on Oct. 24, 2003, now Pat. No. 7,303,657.

(51) Int. Cl.
*B01J 19/08* (2006.01)
*G21D 5/08* (2006.01)
(52) U.S. Cl. .................. 422/186.04; 60/644.1
(58) Field of Classification Search ............. 422/186.04; 60/644.1
See application file for complete search history.

(56) References Cited

U.S. PATENT DOCUMENTS

| | | | |
|---|---|---|---|
| 3,505,035 | A | 4/1970 | Elmar-Manfred Horn et al. |
| 3,795,491 | A | 3/1974 | Winiarczyk |
| 4,701,379 | A | 10/1987 | Pearson et al. |
| 4,945,857 | A | 8/1990 | Marinace |
| 5,242,565 | A | 9/1993 | Winsel |
| 5,702,491 | A | 12/1997 | Long et al. |
| 5,804,329 | A | 9/1998 | Amendola |
| 5,997,821 | A | 12/1999 | Joshi |
| 6,231,825 | B1 | 5/2001 | Colby et al. |
| 6,544,400 | B2 | 4/2003 | Hockaday et al. |

OTHER PUBLICATIONS

Mizuno et al., "Confirmation of Anomalous Hydrogen Generation by Plasma Electrolysis," in 4th Meeting of Japan CF Research Society, 2003, Iwata, Japan: Iwata University.

*Primary Examiner* — Kishor Mayekar
(74) *Attorney, Agent, or Firm* — Wells St. John

(57) ABSTRACT

A method and apparatus for forming a chemical hydride is described and which includes a pseudo-plasma-electrolysis reactor which is operable to receive a solution capable of forming a chemical hydride and which further includes a cathode and a movable anode, and wherein the anode is moved into and out of fluidic, ohmic electrical contact with the solution capable of forming a chemical hydride and which further, when energized produces an oxygen plasma which facilitates the formation of a chemical hydride in the solution.

7 Claims, 1 Drawing Sheet

US 7,939,026 B2

APPARATUS FOR CHEMICAL SYNTHESIS

RELATED APPLICATIONS

This application is a divisional of U.S. patent application Ser. No. 10/693,291 entitled A METHOD AND APPARATUS FOR CHEMICAL SYNTHESIS, filed on Oct. 24, 2003 now U.S. Pat. No. 7,303,657, and is incorporated herein by reference.

GOVERNMENT RIGHTS

The United States Government has certain rights in this invention pursuant to Contract No. DE-AC07-99ID13727, and Contract No. DE-AC07-05ID14517 between the United States Department of Energy and Battelle Energy Alliance, LLC.

TECHNICAL FIELD

The present invention relates to a method and apparatus for chemical synthesis, and more particularly to a method and apparatus for forming a chemical hydride which employs an ionizing gas which encourages the formation of a chemical hydride in a solution.

BACKGROUND OF THE INVENTION

It is well known that most of the energy currently utilized in the world is derived from fossil energy sources. These fossil energy sources are finite in quantity, and the extraction, processing, and utilization of these fossil energy sources has generated various environmental problems which are well known. Researchers through the years have attempted to address these various environmental issues by focusing their investigative efforts into the development of new sources of energy, such as nuclear power. Still further, in recent decades, much attention has been spent on the development of various devices such fuel cells which, in theory, could be utilized to power overland vehicles and produce electricity for assorted other purposes thereby reducing the worlds dependence on fossil fuel sources.

While various fuel cells, and other arrangements have been proposed and which would appear to address, to some degree, these environmental concerns, an economical way of producing a fuel for fuel cells, such as hydrogen has remained elusive.

One of several proposed prior art solutions to this dilemma includes the use of a metal hydride which, when combined with water, would produce hydrogen which could then be utilized by various devices such as fuel cells, internal combustion engines; and the like, to produce a useful output such as electricity.

Several metal hydrides have been suggested for this use. One of the more promising metal hydrides on which much research has been conducted includes the compound sodium borohydride. Currently sodium borohydride is utilized as a reducing agent and as a blowing agent for plastics. Sodium borohydride, is currently produced from the reaction of sodium hydride and trimethyl borate. When sodium borohydride is subsequently reacted with water, and in the presence, for example, of a ruthenium catalyst, hydrogen gas is generated along with sodium metaborate and heat. This sodium metaborate can be recycled in a second chemical reaction by combining it with water plus electricity to produce sodium borohydride and oxygen gas.

While this compound would appear, on a cursory analysis, as being a very attractive means by which hydrogen could be safely stored and then released at a remote location, the costs associated with producing sodium borohydride is still cost prohibitive in relative comparison to the use of traditional fossil fuels such as gasoline.

A method and apparatus for forming a chemical hydride which addresses the shortcomings attendant with the prior art devices and practices utilized heretofore is the subject matter of the present application.

SUMMARY OF THE INVENTION

Therefore, one aspect of the present invention is to provide a method of forming a chemical hydride, which includes providing a composition which is capable of forming a chemical hydride; forming a solution of the composition; and creating an ionizing oxygen gas over the solution of the composition to encourage the formation of the chemical hydride in the solution.

Another aspect of the present invention is to provide a method of forming a chemical hydride which includes, providing a pseudo-plasma-electrolysis reactor defining a cavity; providing a cathode, and mounting the cathode in a fixed location in the cavity; providing a moveable anode, and mounting the anode for movement within the cavity; supplying an aqueous solution of sodium metaborate and water to the cavity of the pseudo-plasma-electrolysis reactor; providing a nuclear reactor which simultaneous heats the aqueous solution of the sodium borate and water, and further generates electrical power; and supplying the electrical power generated by the nuclear reactor to the anode and the cathode to create an ionizing oxygen plasma over the aqueous solution of the sodium borate and which facilitates the chemical generation of sodium borohydride.

Still further, another aspect of the present invention relates to an apparatus for creating a chemical hydride and which includes a pseudo-plasma-electrolysis reactor having top and bottom surfaces, and defining a cavity; an aqueous solution of sodium metaborate and water received within the cavity of the pseudo-plasma-electrolysis reactor; a cathode fixedly mounted on the bottom surface of the pseudo-plasma-electrolysis reactor and which is disposed in fluidic, ohmic electrical contact with the aqueous solution; an anode moveably mounted on the top surface of the pseudo-plasma-electrolysis reactor and which selectively moves into, and out of, fluidic, ohmic electrical contact with aqueous solution; a nuclear reactor which has a hot gas output which provides heat energy; a first heat exchanger coupled in fluid flowing relation relative to the hot gas output, and which is operable to absorb the heat energy of the hot gas output flowing therethrough, and wherein the first heat exchanger is further disposed in fluid flowing relation relative to the cavity of the pseudo-plasma-electrolysis reactor, and wherein the aqueous solution flows through first heat exchanger to absorb the heat energy provided by the hot gas output to increase the temperature thereof; a second heat exchanger disposed in fluid flowing relation relative to the hot gas output, and which is operable to absorb the heat energy of the hot gas flowing therethrough; a source of water coupled in fluid flowing relation relative to the second heat exchanger, and wherein the source of water absorbs the heat energy previously absorbed by the second heat exchanger, and is converted into a source of high pressure steam; a steam turbine coupled in fluid flowing relation relative to the second heat exchanger, and which is operable to receive the source of high pressure steam and produce a mechanical energy output; a generator coupled to the mechanical energy output of the steam turbine, and which generates a source of electricity which is selectively supplied to the anode and the cathode; and an actuator coupled in force transmitting relation relative to the anode and which moves the actuator into, and out of, fluidic contact with the aqueous solution, and wherein the actuator, when energized, moves the anode into fluidic ohmic electrical contact with the aqueous solution, and wherein following contact of the anode with aqueous solution, the source of electricity is applied to the anode and the cathode to create an electrical current in the aqueous solution, and wherein the actuator is then energized to move the anode out of fluidic, ohmic electrical contact with the aqueous solution to form an oxygen plasma therebetween the anode and the aqueous solution, and wherein the formation of the plasma facilitates the chemical reaction of the sodium metaborate and water to produce oxygen gas and sodium borohydride in the aqueous solution.

These and other aspects of the present invention will be discussed in greater detail hereinafter.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

Figure 1:
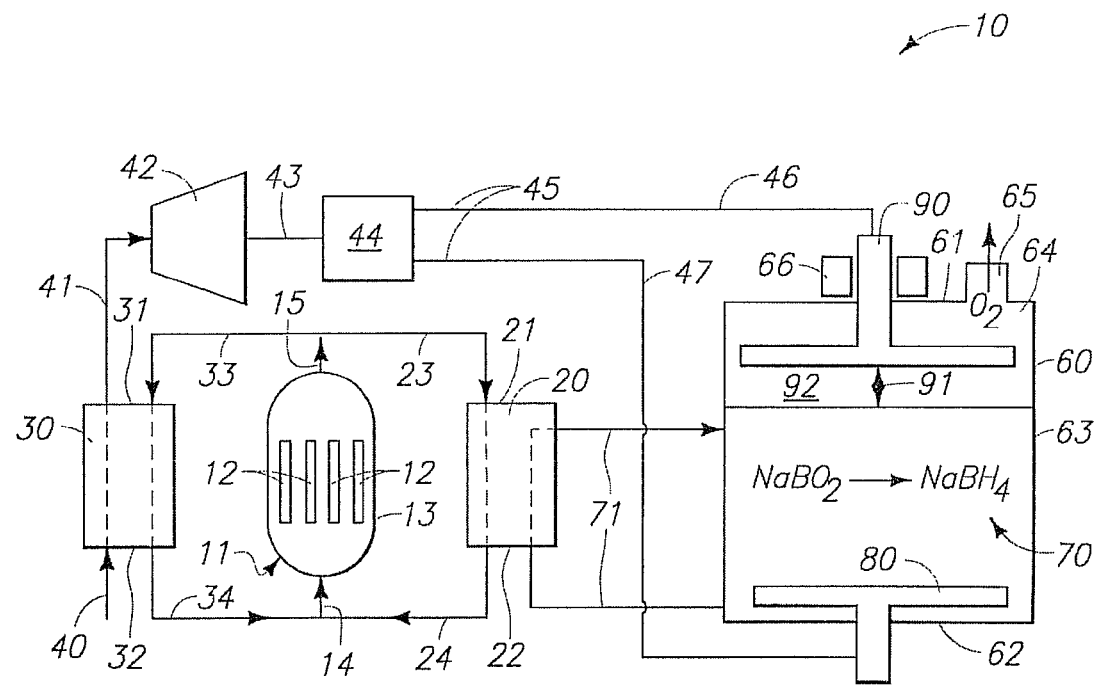
FIG. 1 serves to explain the method and an apparatus for practicing the claimed invention.

This disclosure of the invention is submitted in furtherance of the constitutional purposes of the U.S. Patent Laws "to promote the progress of science and useful arts" (Article 1, Section 8).

The method and apparatus for forming a chemical hydride is generally indicated by the numeral 10 as seen in the drawing.

As shown therein, the method and apparatus 10 includes a high temperature gas cooled nuclear reactor which is generally indicated by the numeral 11. This high temperature gas cooled nuclear reactor 11 includes a plurality of fuel rods 12 which generate a significant amount of heat energy during a controlled nuclear reaction. The gas cooled nuclear reactor includes a container 13 which surrounds the fuel rods, and which further defines a cold helium gas intake 14, and a hot helium gas output, or exhaust which is generally indicated by the numeral 15.

As seen in the drawing, a first heat exchanger, which is generally indicated by the numeral 20, is coupled in fluid flowing relation relative to the hot helium gas exhaust 15 of the high temperature gas cooled nuclear reactor 11. As seen in the drawing, the first heat exchanger 20 has a first end 21, and an opposite second end 22. A first fluid pathway 23 couples the hot helium gas exhaust 15 to the first end 21 of the first heat exchanger. The hot helium gas produced by the high temperature gas cooled nuclear reactor 11 passes through the first heat exchanger 20, and the first heat exchanger is operable to absorb the heat energy provided by the hot helium gas and transfer it to an aqueous solution of borate and water which also passes through the same heat exchanger as will be discussed in greater detail hereinafter.

Still further, a second fluid pathway 24 is provided, and which couples the first heat exchanger 20 in fluid flowing relation relative to the cold helium gas intake 14. Therefore, it will be seen that the first heat exchanger 20 is operable to receive heated helium gas, absorb a portion of the heat energy from same, and then return the cold helium gas to the high temperature gas cooled reactor 11 to be reheated again during subsequent nuclear reactions.

Referring still to the drawing, a second heat exchanger 30 is provided, and which is coupled in fluid flowing relation relative to the hot gas exhaust 15 of the high temperature gas cooled nuclear reactor 11. The second heat exchanger 30 has a first end 31, and an opposite second end 32. A third fluid pathway 33 couples the hot helium gas exhaust 15 to the first end 31 of the second heat exchanger. Similar to the earlier described first heat exchanger 20, the second heat exchanger 30 is capable of absorbing the heat energy of the hot helium gas, and transfer that heat energy, so absorbed, so as to generate a source of electrical power. This process will be discussed in greater detail below. A fourth fluid pathway 34 is provided, and which couples the second end of the second heat exchanger 30 in fluid flowing relation relative to the cold helium gas intake 14. Therefore, it will be seen that the hot helium gas exhaust 15 is coupled to a pair of heat exchangers 20 and 30 for purposes of transferring that same heat energy to other fluids for the purposes which will be discussed below.

Referring still to the drawing, it will be understood that a source of water generally indicated by the numeral 40 is coupled in fluid flowing relation relative to the second heat exchanger 30. The source of water upon being exposed to the heat energy absorbed by the second heat exchanger 30 is converted to a source of high pressure steam 41. A steam turbine 42 is coupled in fluid flowing relation relative to the source of high pressure steam 41, and which, when exposed to the high pressure steam, produces a mechanical energy output 43 which is supplied to a generator 44. The generator 44 upon receiving the mechanical energy output of the steam turbine generates a source of electrical power which is transmitted from the generator by way of electrical pathways 46 and 47, respectively to a pseudo-plasma-electrolysis reactor 60. The pseudo-plasma-electrolysis reactor 60 is defined by a top surface 61; an opposite bottom surface 62; and a sidewall 63 which joins the top and bottom surfaces together. The top, bottom and sidewall surfaces define an internal cavity 64. Still further, a gas passageway 65 is formed in the top surface 61 and communicates with the internal cavity 64 for the purposes which will be described, hereinafter. Yet further, an actuator 66 is mounted on the top surface 61 and is operable to move an anode in a prescribed path of travel within the cavity 64 relative to a fixed cathode as will be described below.

An aqueous solution of sodium metaborate and water 70 is provided and received within the cavity 64 of the pseudo-plasma-electrolysis reactor 60. As will be recognized by a study of the drawing, a fifth fluid pathway 71 is provided, and which couples the cavity 64 in fluid flowing relation relative to the first heat exchanger 20. As should be understood, this fifth fluid pathway 71 permits the aqueous solution 70 to flow through the first heat exchanger to absorb the heat energy provided by the hot helium gas which is supplied from the hot helium exhaust 15 to increase the temperature of the solution. A cathode 80 is fixedly mounted in a submerged location in the aqueous solution of sodium metaborate and water 70 and on the bottom surface 62 of the pseudo-plasma-electrolysis reactor 60. As such, the cathode is disposed in fluidic, ohmic electrical contact with the same aqueous solution.

As seen in the drawing, an anode 90 is moveably mounted on the top surface 61 of the pseudo-plasma-electrolysis reactor 60, and is selectively moveable into and out of fluidic, ohmic electrical contact with the aqueous solution, formed of the sodium metaborate and water 70 in order to create an ionizing oxygen gas over the solution. This ionizing gas encourages the formation of a desirable chemical hydride, such as sodium borohydride in the aqueous solution of sodium metaborate and water 70. The anode 90 is movable into and out of fluidic, ohmic electrical contact with the solution 70 by way of the actuator 66 which, when energized, moves the anode along a path of travel which is generally indicated by the numeral 91.

The method of forming a chemical hydride of the present invention includes the steps of providing a composition, such as the aqueous solution of sodium metaborate and water 70, and which is capable of forming a chemical hydride; forming a solution of the composition 70; and creating an ionizing gas 92 over the solution of the composition to encourage the formation of the chemical hydride in the solution. In the method which is generally described above, the step of creating an ionizing gas 92 over the solution of the composition, which typically comprises sodium metaborate and water, comprises creating or generating an oxygen plasma over the solution of the composition 70. As can be appreciated from a study of the drawing, the method also includes providing a pseudo-plasma-electrolysis reactor 60 which encloses the solution formed of the composition 70; and creating an electrical current in the solution of the composition 70 to form the ionizing gas 92 over the solution. As will be recognized from the drawings, the electrical pathways 46 and 47 provide the electrical power 45 which is generated by the generator 44, to the anode 90 and the cathode 80, respectively. In the method described above, the step of creating the ionizing gas 92 over the solution of the composition 70 includes the steps of first moving the anode 90 into direct fluidic, ohmic electrical contact with the solution of the composition 70 which is typically formed of sodium metaborate and water; second, energizing the anode 90 and the cathode 80 to create an electrical current through the solution of the composition and between the anode and the cathode to establish an initial electrolysis to generate the oxygen gas at the anode for subsequent ionization 92; and third, while generating the oxygen gas, moving the anode 90 out of fluidic, ohmic electrical contact with the solution of the composition 70 to create the ionized oxygen gas 92 over the solution 70 of the composition, and between the spaced anode 90 and the solution 70.

The method as described above further includes providing a high temperature gas cooled nuclear reactor 11 which has a hot gas exhaust 15 having heat energy; providing a first heat exchanger 20 coupled in fluid flowing relation relative the hot gas exhaust 15, and wherein the first heat exchanger 20 absorbs a portion of the heat energy from the hot gas exhaust; coupling the solution of the composition 70 in fluid flowing relation relative to the first heat exchanger by way of a fluid pathway 71; and wherein the heat energy absorbed by the first heat exchanger 20 heats the solution of the composition 70 to a temperature; providing a second heat exchanger 30 coupled in fluid flowing relation relative to the hot gas exhaust 15, and wherein the second heat exchanger 30 absorbs a portion of the heat energy from the hot gas exhaust 15; providing a source of water 40 to the second heat exchanger 30, and wherein the heat energy absorbed by the second heat exchanger converts the water into high pressure steam 41; providing a steam turbine 42 and supplying the high pressure steam 41 to the steam turbine to produce a mechanical energy output 43; providing an electrical generator 44, and coupling the electrical generator to the mechanical energy output to generate electrical power 45; and supplying the electrical power 45 to create the ionized oxygen gas 92 over the solution 70. As should be understood, the supplying of the electrical power generated by the nuclear reactor to the anode 90 and the submerged cathode 80 creates an oxygen plasma 92 over the aqueous solution of the sodium borate and water 70 and which further facilitates the chemical generation of sodium borohydride from the same solution 70.

Operation

The operation of the described embodiment of the present invention is believed to be readily apparent and is briefly summarized at this point.

An apparatus for practicing the claimed method of creating a chemical hydride 10 is shown the drawing. The method of the present invention includes providing a pseudo-plasma-electrolysis reactor 60 having top and bottom surfaces 61 and 62, and which further defines a cavity 64. An aqueous solution of sodium metaborate and water 70, is received in the cavity 64 of the pseudo-plasma-electrolysis reactor. A cathode 80 is fixedly mounted on the bottom surface 62 of the pseudo-plasma-electrolysis reactor and is further disposed in fluidic, ohmic electrical contact with the aqueous solution 70. An anode 90 is moveably mounted on the top surface of the pseudo-plasma-electrolysis reactor and which selectively moves into, and out of fluidic, ohmic electrical contact with the aqueous solution 70. A nuclear reactor which has a hot gas output 15 provides heat energy. A first heat exchanger is provided and is coupled in fluid flowing relation relative to the hot gas exhaust 15 and is operable to absorb the heat energy of the hot gas exhaust flowing therethrough. The first heat exchanger is further disposed in fluid flowing relation relative to the cavity 64 of the pseudo-plasma-electrolysis reactor 60. As described above, the aqueous solution 70 flows through the first heat exchanger 20 to absorb the heat energy provided by the hot gas exhaust to increase the temperature thereof. A second heat exchanger 30 is provided and is disposed in fluid flowing relation relative to the hot gas exhaust 15 and further is operable to absorb the heat energy of the hot gas exhaust flowing therethrough. A source of water 40 is coupled in fluid flowing relation relative to the second heat exchanger 30, and wherein the source of water absorbs the heat energy previously absorbed by the second heat exchanger 30 and is converted into a source high pressure steam 41. A steam turbine 42 is coupled in fluid flowing relation relative to the second heat exchanger and is operable to receive the source of high pressure steam and which further produces a mechanical energy output 43. A generator 44 is coupled to the mechanical energy output of the steam turbine and generates a source of electricity 45 which is selectively supplied to the anode 90 and the cathode 80. An actuator 66 is coupled in force transmitting relation relative to the anode and which moves the anode 90 into and out of fluidic contact with the aqueous solution. In operation, the actuator, when energized, moves the anode 90 into fluidic ohmic electrical contact with the aqueous solution, and wherein, following contact of the anode 90 with aqueous solution, the source of electricity 45 is applied to the anode 90 and the cathode 80 to create an electrical current in the aqueous solution, and which facilitates an initial electrolysis of the aqueous solution. The actuator is then energized to move the anode 90 out of fluidic, ohmic electrical contact with the aqueous solution to form an oxygen plasma 92 therebetween the anode and the aqueous solution. The formation of the oxygen plasma 92 facilitates the chemical reaction of the sodium metaborate and water solution 70 to enhance the production of oxygen gas which is vented through the gas passageway 65 to ambient, and a resulting sodium borohydride in the aqueous solution.

Therefore it will be seen that the present invention provides a convenient means whereby a chemical hydride can be economically formed by utilizing the energy and heat output of a nuclear reactor in a manner not possible heretofore.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. An apparatus for creating a chemical hydride, comprising:
   a pseudo-plasma-electrolysis reactor having top and bottom surfaces, and defining a cavity;
   an aqueous solution formed of sodium metaborate and water, and which is received in the cavity;
   a cathode mounted on the bottom surface of the pseudo-plasma-electrolysis reactor and submerged in the aqueous solution;
   an anode moveably mounted on the top surface of the pseudo-plasma-electrolysis reactor and which is operable to move into, and out of fluidic ohmic electrical contact with the aqueous solution formed of the sodium metaborate and the water; and
   a source of electrical power electrically coupled to the anode and the cathode, and wherein the application of the electrical power to the anode and the cathode facilitates the chemical reaction of the sodium metaborate and the water to form a chemical hydride in the solution.

2. An apparatus as claimed in claim 1, and further comprising:
   a nuclear reactor which has a hot gas exhaust containing heat energy;
   a first heat exchanger coupled in fluid flowing relation relative to the hot gas exhaust of the nuclear reactor, and the aqueous solution of sodium metaborate and water, and wherein the first heat exchanger absorbs the heat energy provided by the hot gas exhaust and transfers it to the aqueous solution of sodium metaborate and water to raise the temperature of the aqueous solution of sodium metaborate and water; and
   a second heat exchanger coupled in fluid flowing relation relative to the hot gas output of the nuclear reactor and which absorbs the heat energy of the hot gas output, and which transfers the heat energy, so absorbed, so as to generate the source of electrical power.

3. An apparatus as claimed in claim 2, and further comprising:
   a source of water coupled in fluid flowing relation relative to the second heat exchanger, and wherein the source of water, upon being exposed to the heat energy absorbed by the second heat exchanger, is converted into a source high pressure steam;
   a steam turbine coupled in fluid flowing relation relative to the source of steam and which, when exposed to the high pressure steam, produces a mechanical energy output; and
   a generator coupled to the mechanical energy output of the steam turbine and which generates the source of the electrical power.

4. An apparatus as claimed in claim 1, and wherein the electrical power generates an oxygen plasma, and wherein the chemical reaction of the sodium metaborate and the water generates oxygen gas and sodium borohydride in the aqueous solution.

5. An apparatus as claimed in claim 1, and wherein the anode is moved into fluidic, ohmic electrical contact with the aqueous solution, and is then energized by supplying the electrical power to both the anode and the cathode, and wherein an electrical current is established in the aqueous solution, and which facilitates an initial electrolysis of the aqueous solution, and wherein following the energizing of the anode and cathode which facilitates the electrolysis, the anode is moved out of fluidic, ohmic electrical contact with the aqueous solution to form a plasma which enhances the chemical reaction of sodium metaborate and the water to form the chemical hydride.

6. An apparatus as claimed in claim 5, and wherein, the plasma comprises an oxygen plasma, and the chemical hydride comprises sodium borohydride.

7. An apparatus for creating a chemical hydride, comprising:
   a pseudo-plasma-electrolysis reactor having top and bottom surfaces and defining a cavity;
   an aqueous solution of sodium metaborate and water received within the cavity of the pseudo-plasma-electrolysis reactor;
   a cathode fixedly mounted on the bottom surface of the pseudo-plasma-electrolysis reactor and which is disposed in fluidic, ohmic electrical contact with the aqueous solution;
   an anode moveably mounted on the top surface of the pseudo-plasma-electrolysis reactor and which selectively moves into, and out of fluidic, ohmic electrical contact with the aqueous solution;
   a nuclear reactor which has a hot gas exhaust which provides heat energy;
   a first heat exchanger coupled in fluid flowing relation relative to the hot gas output and which is operable to absorb the heat energy of the hot gas exhaust flowing therethrough, and wherein the first heat exchanger is further disposed in fluid flowing relation relative to the cavity of the pseudo-plasma-electrolysis reactor, and wherein the aqueous solution flows through first heat exchanger to absorb the heat energy provided by the hot gas exhaust to increase the temperature thereof;
   a second heat exchanger disposed in fluid flowing relation relative to the hot gas output and which is operable to absorb the heat energy of the hot gas flowing therethrough;
   a source of water coupled in fluid flowing relation relative to the second heat exchanger, and wherein the source of water absorbs the heat energy previous absorbed by the second heat exchanger and is converted into a source of high pressure steam;
   a steam turbine coupled in fluid flowing relation relative to the second heat exchanger and which is operable to receive the source of high pressure steam and produce a mechanical energy output;

a generator coupled to the mechanical energy output of the steam turbine and which generates a source of electricity which is selectively supplied to the anode and the cathode; and an actuator coupled in force transmitting relation relative to the anode and which moves the anode into and out of fluidic contact with the aqueous solution, and wherein the actuator, when energized, moves the anode into fluidic, ohmic electrical contact with the aqueous solution, and wherein following contact of the anode with the aqueous solution, the source of electricity is applied to the anode, and the cathode, to create an electrical current in the aqueous solution, and wherein the actuator is then energized to move the anode out of fluidic, ohmic electrical contact with the aqueous solution to form an oxygen plasma therebetween the anode and the aqueous solution, and wherein the formation of the plasma facilitates the chemical reaction of the sodium metaborate and water to produce oxygen gas and sodium borohydride in the aqueous solution.

* * * * *